(No Model.)

H. J. HJORTH.
BREAST OR HAND DRILL.

No. 540,984. Patented June 11, 1895.

Witnesses.
Lauritz N. Möller
J. L. Hosmer

Inventor
Henrick Julius Hjorth
by Alban Andrén
his atty.

UNITED STATES PATENT OFFICE.

HENRICK JULIUS HJORTH, OF BOSTON, MASSACHUSETTS.

BREAST OR HAND DRILL.

SPECIFICATION forming part of Letters Patent No. 540,984, dated June 11, 1895.

Application filed November 13, 1894. Serial No. 528,705. (No model.)

*To all whom it may concern:*

Be it known that I, HENRICK JULIUS HJORTH, a citizen of Sweden, and a resident of Boston, (Brighton,) in the county of Suffolk and State of Massachusetts, have invented new and useful Improvements in Breast or Hand Drills, of which the following, taken in connection with the accompanying drawings, is a specification.

This invention relates to improvements in breast or hand drills for the purpose of drilling holes in wood, metal or other materials, and it is carried out as follows, reference being had to the accompanying drawings, wherein—

Figure 1:
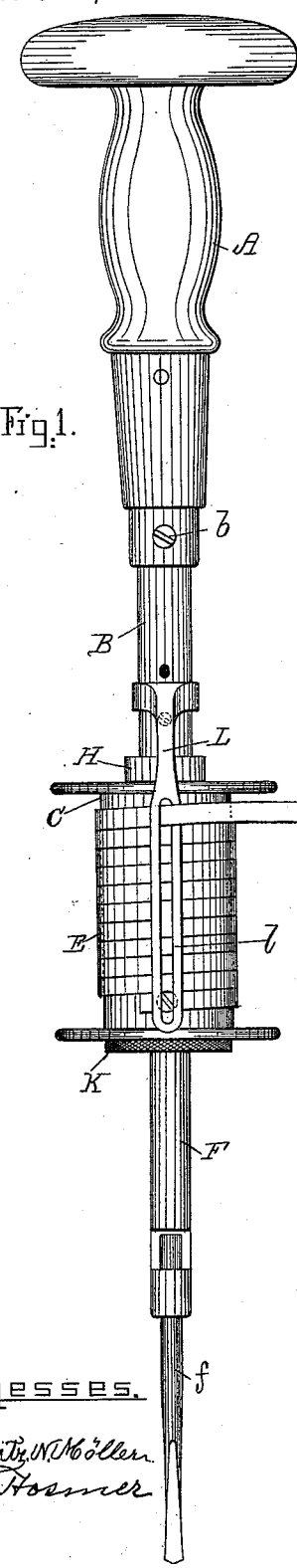
Figure 2:
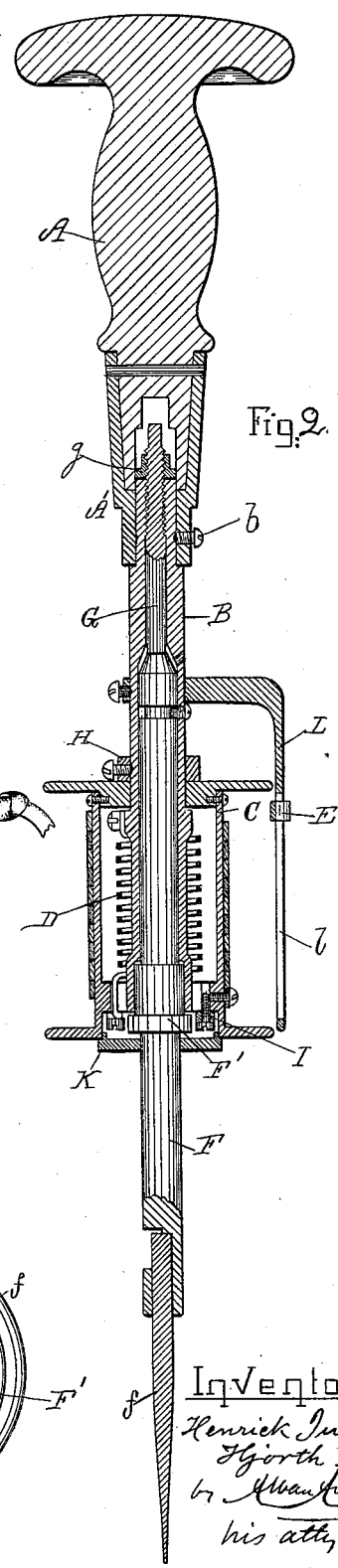
Figure 3:
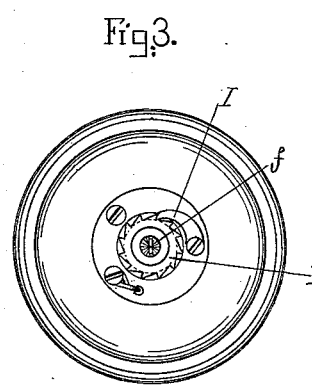

Figure 1 represents a side elevation of the invention. Fig. 2 represents a central longitudinal section thereof, and Fig. 3 represents a bottom plan view showing the pulley cap removed.

Similar letters refer to similar parts wherever they occur on the different parts of the drawings.

In the drawings A represents a suitable handle to the lower end of which is secured a metal ferrule A', in which is firmly secured by means of a set screw $b$, the hollow spindle or sleeve B as shown in Fig. 2. On said sleeve B is loosely journaled the flanged cord pulley C as shown.

D is a coiled spring surrounding the sleeve B, within the pulley C, and one end of said spring is secured to the said sleeve B, and its other end secured in a suitable manner to the pulley C.

To the exterior of the pulley C is secured a band, or cord E, which is wound spirally around said pulley, and provided in its free end with a suitable knob or handle $e$, for the operator to take hold of when operating the drill, as will hereinafter be described.

Within the stationary sleeve B, is loosely journaled the drill spindle F, which carries the drill $f$ as shown.

The upper hardened end of the drill spindle F, is adapted to bear against a hardened adjustable rest post G, which is screw threaded and screwed through a screw threaded longitudinal perforation in the upper end of the sleeve B, as shown in Fig. 2; and by this arrangement the end support of the drill spindle F, is made adjustable so as to prevent it or any of its connections from frictional end pressure against pulley C during the use of the drill.

In practice I prefer to provide the screw G with a check nut $g$ so as to secure said screw in position after being adjusted.

H is a collar secured to the sleeve B, back of the pulley C, for the purpose of preventing the latter from moving upward on said sleeve B, as shown in Figs. 1 and 2.

To the drill spindle F, at or near the lower end of the pulley C, is secured, or made in one piece with it, a ratchet wheel F', and to the lower end of said pulley C, is pivoted a spring pressed pawl I, adapted to engage with the teeth of the ratchet wheel F', as shown in Fig. 3.

K, in Figs. 1 and 2 is a cap secured in a suitable manner to the lower end of the pulley C, for the purpose of covering said end and preventing dust and dirt, &c., from entering at this place.

In practice I prefer to secure to the sleeve B, above the pulley C, a cord guide L, extending downward in front of the pulley C, and provided with a longitudinal slot $l$ through which the cord E, is guided while it is being drawn from or wound on the pulley C, and said cord guide serves for the purpose of preventing the said cord from slipping off the ends of the pulley C, in case the operator should not pull the cord in or about a right angle to the axis of the drill.

One end of the cord guide L, is bent laterally at substantially right angles to the main portion thereof, said bent end being provided with a collar which surrounds the sleeve B, and is secured thereto by a set-screw being passed through a threaded aperture in the collar.

The cord-guide L is longitudinally adjustable on the sleeve B and is secured thereto by means of a set screw X. This longitudinal adjustment of the cord-guide is very necessary for the reason that it frequently happens, when the drill is in constant use, that a certain amount of wear takes place on the upper end of the drum which is taken up by the adjustable collar H, and which would of course necessitate an adjustment of the cord-guide, and by the simple construction of this portion of the device herein shown and described, said cord-guide can be easily adjusted both longitudinally and in a circular direction upon the sleeve.

In using the device the operator places the point of the drill $f$, against the article to be drilled, and takes hold of the handle A, and presses it with proper pressure against the part to be drilled. With his other hand, he takes hold of the knob $e$, and pulls on the cord or strap E by which the drill is caused to rotate with the pulley C, against the influence of the coiled spring D, by the interlocking of the pawl I, with the ratchet wheel F', and thereby causing the boring to be accomplished. By releasing the tension on the cord E, the pulley C is caused to rotate in an opposite direction by the influence of the spring D, by which the cord E, is wound upon the said pulley C, and so on during the operation of the device. During the return rotary motion of the pulley C, the drill $f$, and its spindle F is held stationary, and the pawl I, allowed to slip freely around the ratchet wheel F'.

What I wish to secure by Letters Patent and claim is—

The herein described breast and hand drill consisting of a hand portion having a sleeve rigidly secured thereto, a drill spindle journaled in said sleeve, a spring actuated pulley loosely mounted upon the sleeve, a collar H adjustably secured to the sleeve above the pulley, a dust cap K mounted upon the drill-spindle and covering the lower portion of the drum, a slotted cord-guide L having one of its ends bent at a right angle to the slotted portion, said bent end terminating in a hub or collar which surrounds and is secured to the sleeve by means of a set-screw, said cord-guide being adjustable upon the sleeve relative to the drum, and an operating cord passing through the slot in the guide and having one of its ends secured to the drum, and its free end provided with a hand-ball, substantially as described.

In testimony whereof I have signed my name to this specification, in the presence of two subscribing witnesses, on this 2d day of October, A. D. 1894.

HENRICK JULIUS HJORTH.

Witnesses:
ALBAN ANDRÉN,
J. L. HOSMER.